United States Patent [19]

Stein

[11] Patent Number: 5,457,382
[45] Date of Patent: Oct. 10, 1995

[54] APPARATUS FOR TESTING DOCUMENTS HAVING MAGNETIC PROPERTIES

[75] Inventor: Dieter Stein, Holzkirchen, Germany

[73] Assignee: GAO Gesellschaft für Automation und Organisation mbH, Munich, Germany

[21] Appl. No.: 991,480

[22] Filed: Dec. 16, 1992

Related U.S. Application Data

[63] Continuation of Ser. No. 728,711, Jul. 11, 1991, abandoned.

[30] Foreign Application Priority Data

Jul. 17, 1990 [DE] Germany ..................... 40 22 739.1

[51] Int. Cl.⁶ ................ G07D 7/00; G06K 7/08; G01N 27/72; G01R 33/12
[52] U.S. Cl. .............. 324/239; 324/262; 235/449; 209/569
[58] Field of Search .............. 324/174, 207.15, 324/207.2, 207.21, 239, 240, 241, 242, 243, 262; 235/449, 450; 209/569, 520; 382/7, 64

[56] References Cited

U.S. PATENT DOCUMENTS

| | | | |
|---|---|---|---|
| 3,060,370 | 10/1962 | Varterasien | 324/207.2 |
| 3,875,545 | 4/1975 | Curtiss | 336/110 |
| 3,972,156 | 8/1976 | Bennett, Jr. et al. | 56/10.2 |
| 4,270,088 | 5/1981 | Weischedel | 324/242 |
| 4,471,303 | 9/1984 | Okubo | 324/207.22 |

FOREIGN PATENT DOCUMENTS

| | | |
|---|---|---|
| 348901 | 3/1979 | Australia . |
| 0295229 | 12/1988 | European Pat. Off. . |
| 1474466 | 8/1969 | Germany . |
| 2631404 | 1/1978 | Germany . |
| 59-178383 | 10/1984 | Japan . |

*Primary Examiner*—Walter E. Snow
*Attorney, Agent, or Firm*—Gottlieb, Rackman & Reisman

[57] ABSTRACT

In an apparatus for testing test objects equipped with magnetic properties, the magnetic circuit with an air gap having a detector consists of at least a soft-magnetic material and a permanent-magnetic material, whereby the static magnetic field produced by the permanent-magnetic material penetrates the magnetic circuit. The air gap is preferably formed between an end of the soft-magnetic material and a pole of the permanent-magnetic material.

16 Claims, 3 Drawing Sheets

5,457,382

APPARATUS FOR TESTING DOCUMENTS HAVING MAGNETIC PROPERTIES

This is a continuation of application Ser. No. 07/728,711, filed Jul. 11, 1991, now abandoned.

The present invention relates to an apparatus for testing flat objects equipped with magnetic properties, for example documents, the apparatus having at least one magnetic circuit with a magnetic detector and an air gap which is located in a static magnetic field.

BACKGROUND OF THE INVENTION

An assembly of the aforesaid type for testing bank notes with magnetic properties, for example magnetic particles, is known from EP-A2 0 295 229. The measuring apparatus comprises a permanent magnet and a magnetic circuit which is located above the permanent magnet. The magnetic circuit has two like-shaped legs made of the same material with an air gap between the legs and a coil wound about the yoke of the magnetic circuit. The permanent magnet is positioned relative to the magnetic circuit in such a way that its field extends in the air gap in a plane perpendicular to the direction of transport. The bank note is moved past the air gap in such a way that the static magnetic field acts on the magnetic particles. The magnetized particles moved past the air gap induce in the magnetic circuit a change of flux which produces a corresponding signal at the coil.

The essence of the known apparatus is that the static permanent field is oriented such that its lines of flux are not coupled into the magnetic circuit, which is intended to avoid a saturation magnetization of this circuit.

However, the selected arrangement of the magnetic circuit and the permanent magnet has the disadvantage that only a small part of the total static magnetic field can act on the magnetic particles. This makes the degree of magnetization of these particles accordingly small, so that the signals induced in the coil are also small.

BRIEF DESCRIPTION OF THE INVENTION

The objective of the present invention is the provision of an apparatus for testing magnetic properties of flat test objects, such as bank notes and like documents having magnetic particles embedded therein, which provides sufficiently reliable signals in particular when measuring magnetic particles with low remanence.

This objective is achieved according to the invention by the provision of an apparatus in which the magnetic circuit consists of a soft-magnetic material and a permanent-magnetic material, the static permanent field penetrating the soft-magnetic part, which has for example a coil. The permanent-magnetic material prefereably consists of a highly coercive material, such as SmCo or Nd FeB. The apparatus preferably is also provided with a shielding housing that is open on the measuring side and is made of, for example, a highly permeable material. The strength of the static permanent field is selected such that the soft-magnetic material has high permeability at the operating point. By selecting a suitable soft-magnetic material and the number of windings in the coil one can adjust the sensitivity of the system.

In a first embodiment the inventive apparatus comprises a magnetic circuit with a coil located on a soft-magnetic material. The soft-magnetic material ends on one side in a pole shoe and is connected on the other side with a permanent-magnetic material, the permanent magnet. It is essential that the air gap, and thus the stray field of the assembly, is formed between the pole shoe, on the one hand, and the magnetic pole of the permanent magnet, on the other hand. The pole shoe and the magnetic pole of the permanent magnet are brought as close as possible to the transport path of the test object. The magnetic particles in the test objects thus considerably increase the flux density in the stray field area and thus that in the magnetic circuit. A corresponding change in voltage can be tapped at the ends of the coil.

When the printed pattern of a bank note doped with magnetic particles is being tested the stray field is preferably oriented such that it extends parallel to an edge of the printed pattern, since the time gradient of the flux density is thus particularly great.

However, the air gap, and thus the stray field, can also be oriented parallel to the direction of transport of the document, whereby the air gap should be selected as narrow as possible to obtain an accordingly high time gradient in the flux density with this arrangement as well.

With both the former and the latter orientation of the stray field, two magnetic circuits can be provided, the air gaps being formed between the same poles of two permanent magnets and a pole shoe of the soft-magnetic material, or between two pole shoes of the soft-magnetic material and the pole of a permanent magnet.

The inventive apparatus has above all the advantage that particularly magnetic particles with small remanence, whose characteristic property is their permeability, can be detected with high reliability.

A second system which is connected with the first system for example also via soft-magnetic material and whose coils are connected electrically in series can be used to compensate to zero magnetic noise fields that act on the overall assembly, since these fields pass both systems in the same direction.

BRIEF DESCRIPTION OF THE DRAWINGS

The foregoing and other objects, characteristics and advantages of the invention will be more clearly understood from the following description of several embodiments thereof when read with reference to the accompanying drawings, in which:

FIG. 1 shows a first embodiment of the inventive apparatus in a perspective view. Test object 1, for example a bank note, has magnetic particles in the color of printed pattern 2.

Figure 1:
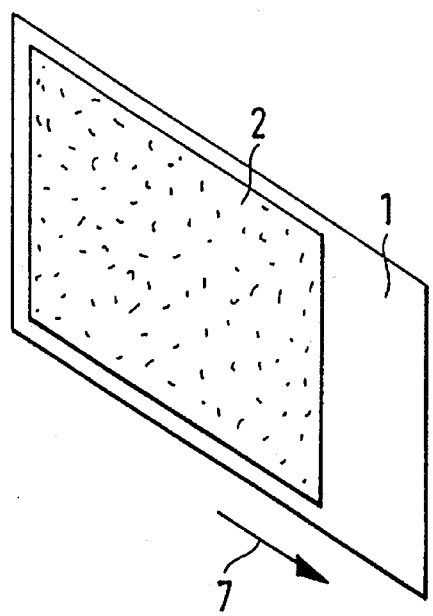
FIG. 1 shows an inductive measuring apparatus according to one embodiment of the invention and illustrates the same as disposed in the area of the transport path of a test object.
Figure 1:
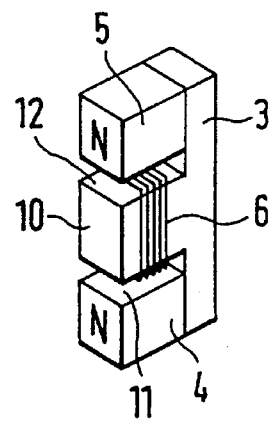

The magnetic particles are distributed evenly over the total printed pattern, as suggested in FIG. 1. Test object 1 is moved past apparatus along a path perpendicular to the the vertically disposed apparatus.

The measuring apparatus comprises a soft-magnetic yoke-shaped part 3 with a coil 6 thereon and two permanent magnets 4 and 5 at the opposite ends of the yoke. The permanent magnets are connected with the soft-magnetic material yoke 3 with the same pole (here the south pole) in each case, with the other pole of each of the permanent magnets 4, 5 and the free end of the pole shoe 10 pointing to the surface of the bank note. The free poles of the permanent magnets (north poles) both end in the end plane of pole shoe 10. The total assembly, comprising in sequence from end to end a permanent magnet—a pole shoe—a permanent magnet, is dimensioned such that it covers approximately the width of test object 1. The selected arrangement results in two magnetic circuits between pole shoe 10 and permanent magnets 4 and 5 in each case. Between the free ends of the assembly there are two air gaps 11, 12 to produce magnetic stray fields which can be influenced by the magnetic particles in printed pattern 2 of bank note 1.

The magnetic circuits can also be produced in the reverse way between two pole shoes of the soft-magnetic material yoke and a permanent magnet disposed between these pole shoes, resulting in the arrangement (not shown) pole shoe—permanent magnet—pole shoe.

A measuring apparatus comprising a permanent magnet and a pole shoe also solves in principle the problem underlying the invention, resulting in only one magnetic circuit with an air gap pointing to the bank note, and the corresponding stray field. If such an assembly is also to cover approximately the width of the test object the permanent magnet must be made accordingly strong due to the larger air gap in order to obtain the flux density necessary for an operating point of high permeability in the soft-magnetic material.

Figure 2:
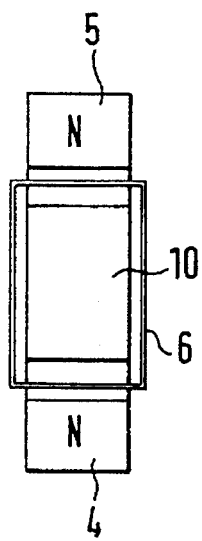
FIGS. 2, 3 and 4 show the measuring apparatus of FIG. 1 in a front view and in two side views, respectively, the latter two views being shown one with and one without a test object in the vicinity of the poles.
Figure 3:
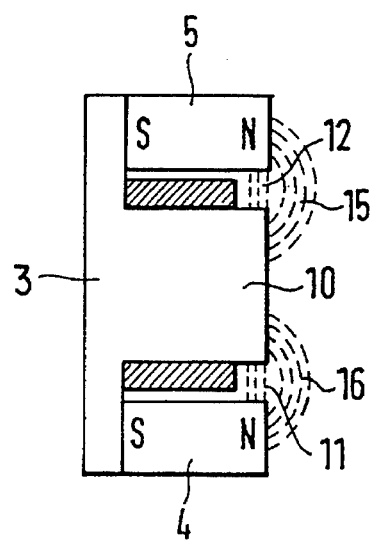
Figure 4:
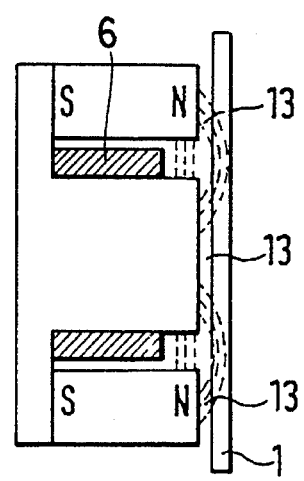

The influence of the magnetic particles of the bank note on the stray field are best described with reference to FIGS. 2, 3 and 4. FIGS. 2 and 3 show the apparatus of FIG. 1 in a front view and a side view. FIG. 3 shows the fundamental field pattern of the assembly in the absence of a test object 1. Stray fields 15 and 16 arising in and above air gaps 11 and 12 are comparable to the field of a horseshoe magnet. A test object with high permeability and sufficient thickness and at a sufficiently small distance changes the field pattern, as shown in FIG. 4. The flux density above the pole shoe or the poles of the permanent magnets has considerably increased, since test object 1 in series with smaller air gaps 13 between it and the pole shoe or the poles of the magnets constitutes a lower magnetic resistance for the soft-magnetic circuits than larger air gaps 11, 12 between pole shoe 10 and the poles of permanent magnets 4, 5. The air gaps between the pole shoes and the magnet are therefore favorably selected so as to be larger, preferably at least twice as large, as the distance from the test object. As the representations in FIGS. 3 and 4 show, the magnetic particles brought into the stray field of the assembly effect a flux density difference which is detected as induction voltage in the measuring coil.

A test object that does not attain such a complete magnetic shield of the fields due to its lower permeability, smaller thickness and larger distance from the measuring apparatus produces a field pattern that is a mixture of the boundary states shown in FIGS. 3 and 4. The induction voltage is accordingly small in this case.

As already mentioned, the strength of the static permanent field in the magnetic circuit is selected such that the soft-magnetic material has maximal permeability at the magnetic operating point. Obtainable flux densities in soft-magnetic materials are 0.1 to 1 Tesla.

Figure 5:
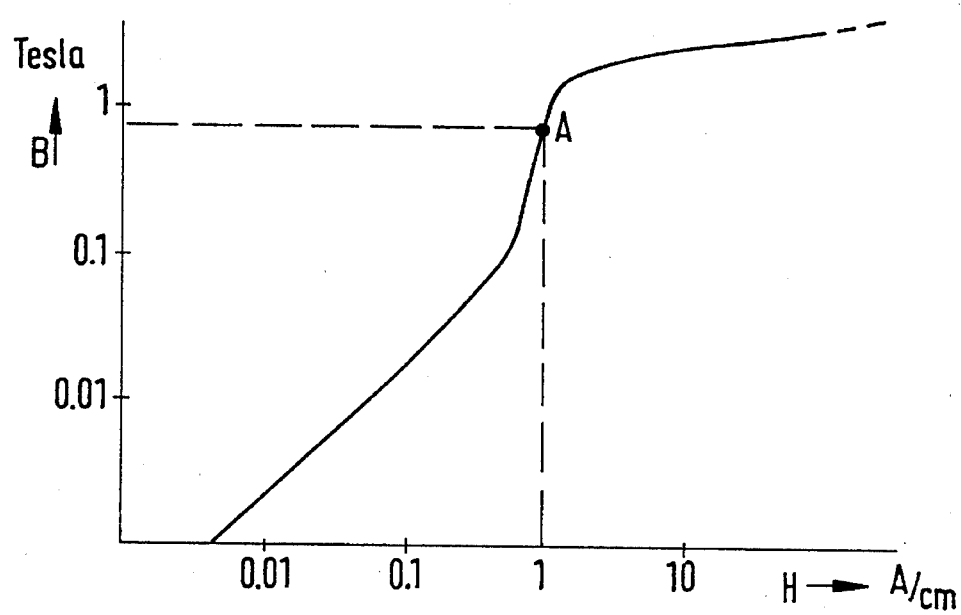
FIG. 5 shows the hysteresis curve of a soft-magnetic material.

FIG. 5 shows the hysteresis curve of a soft-magnetic material (Vacoflux 50) in a logarithmic representation. In this material the permeability reaches values of $\mu > 10.000 \cdot u_o$ at an operating point of about 0.6 Tesla. At this operating point, at which the hysteresis curve is very steep, changes in field strength result in accordingly strong changes in the induction amplitude.

The voltage induced in the coil of the magnetic circuit obeys the law:

$$U = -\mu_o \cdot \mu_r \cdot N \cdot A \cdot \frac{dH}{dt}$$

where N is the number of windings of the coil and $$\mu_r = \frac{dB}{dH} \text{ /operating point.}$$

By selecting a suitable soft-magnetic material for the pole shoe and the number of windings of the coil, one can adjust the sensitivity of the system. If the permanent magnets are disposed above and below the pole shoe perpendicular to the direction of transport, as shown in FIGS. 1 to 4, the time gradient of the flux density is particularly great for an edge of the printed pattern moved across the measuring system. Due to the described measures, particularly magnetic particles with low remanence are therefore detectable with high reliability using the inventive apparatus.

Figure 6:
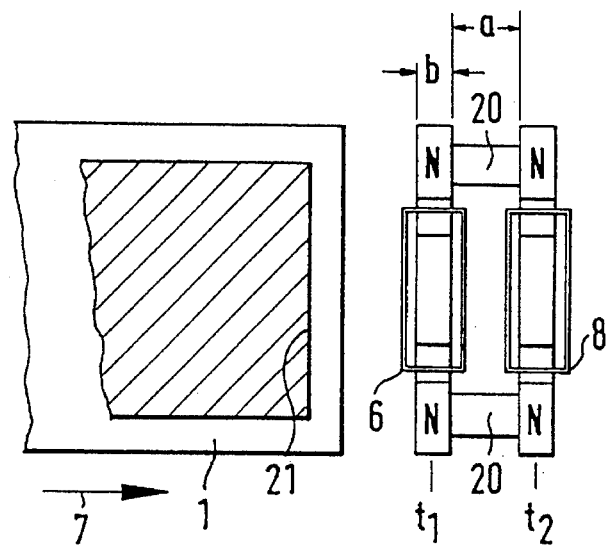
FIG. 6 shows another embodiment of the invention which includes two measuring apparatus disposed one behind the other in the direction of transport of the test object.

FIG. 6 shows, in a further embodiment of the invention, two systems disposed side by side and thus one behind the other as viewed in the direction of transport of the test object (arrow 7). The systems are of the structure already shown in FIG. 1. Coil 8 of the second system, regarded in the direction of transport, is connected in series, but with opposite polarity, with coil 6 of the first system. In this way interference signals acting simultaneously on both systems are compensated.

The systems can be interconnected via soft-magnetic material pieces 20. In accordance with the thickness of such connecting pieces, distance a between the systems can be adjusted. Distance a and width b of the pole shoes ultimately determine the selectivity of the system.

Figure 7:
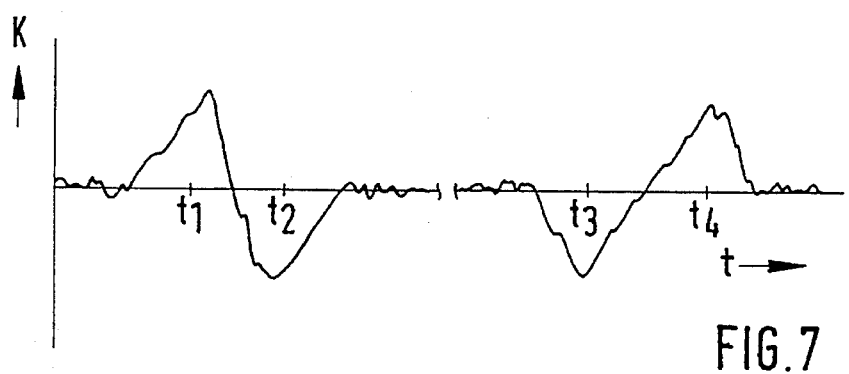
FIG. 7 shows a voltage pattern at the measuring coil when a test object passes the apparatus of FIG. 6.

FIG. 7 shows a highly simplified signal pattern that results when a test object passes the system shown in FIG. 6. In this embodiment, the test object is a bank note 1 whose printed pattern is provided almost all over with magnetic particles, so that incoming edge 21 of the printed pattern successively produces the shown signal levels of different polarity at times t1 and t2. In the same way the outgoing edge of the printed pattern produces the shown signal levels at times t3 and t4.

As mentioned, variables a and b determine the spatial resolution of the system. At a pole shoe width of about b=1.5 mm, and a distance between the systems of about a=3 mm an edge of the printed pattern can be detected with high reliability, as shown in FIG. 7. To detect printed lines or patterns which are doped with magnetic particles the stated variables should be adapted accordingly.

Figure 8:
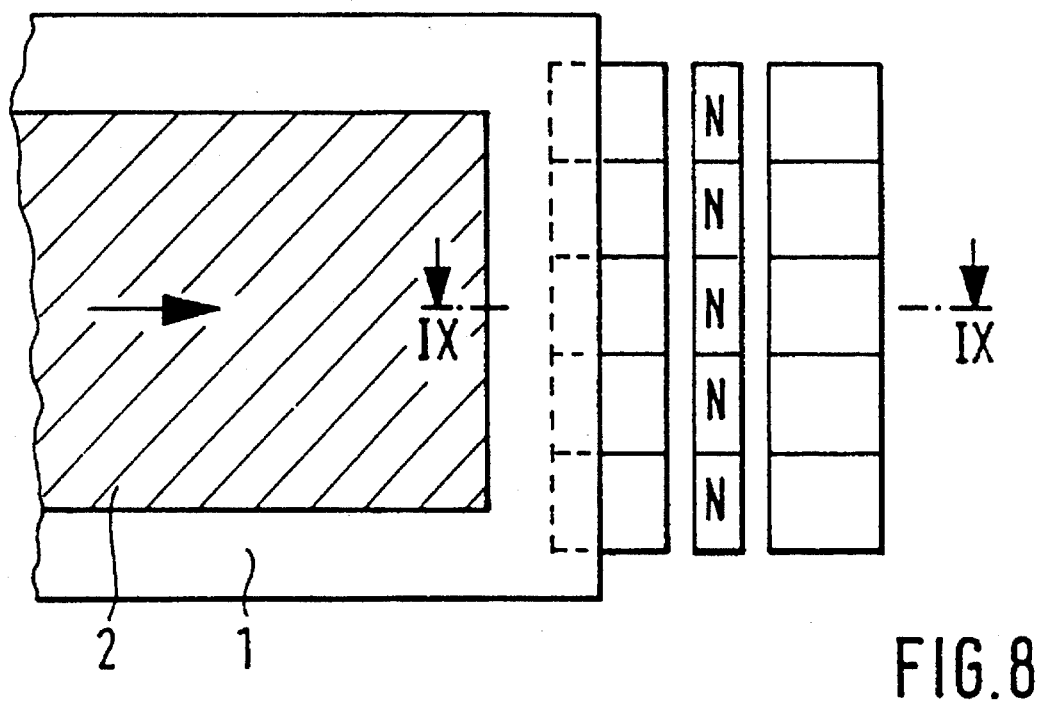
FIG. 8 shows an elevational view of a multi-channel apparatus according to another embodiment of the invention.
Figure 9:
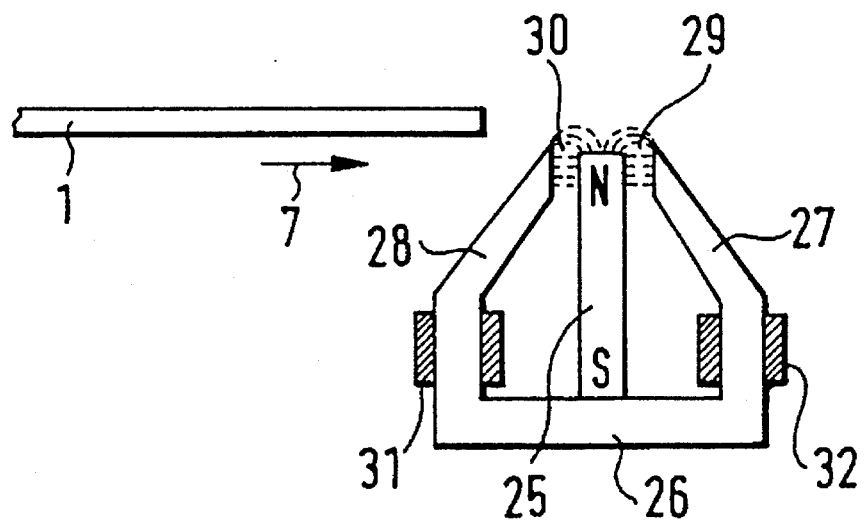
FIG. 9 is a sectional view taken along the line IX—IX in FIG. 8.

FIGS. 8 and 9 show a further embodiment of the invention in which a first pole shoe, of a soft-magnetic material yoke 26, the north pole of a permanent magnet and a second pole shoe of the yoke are disposed one behind the other in the direction of relative movement between the measuring system and the test object. Thus, as shown in cross section in FIG. 9, permanent magnet 25 is disposed between two pole shoes of a horseshoe-shaped soft-magnetic material yoke 26. The two soft-magnetic pole shoes are designed as like-shaped legs 27, 28 whose ends each form an air gap 29, 30 with the free pole of the permanent magnet. Coils 31, 32 are provided on the two legs. The formation of the stray fields and their interaction with the test object are similar to the systems described above.

An advantage of the arrangement shown in FIG. 9 is in particular that a multichannel system can be constructed in a simple way with the arrangement of the elements, the individual systems being disposed side by side perpendicular to the direction of transport of the test object. FIG. 8 shows a five-track assembly of this type which also permits detailed measurements, for example in the printed pattern. The individual systems may optionally be decoupled magnetically by suitable measures to minimize cross-talk.

I claim:

1. An apparatus for testing documents having magnetic properties, said apparatus including at least one magnetic circuit with a magnetic detector and an air gap that is located in a static magnetic field;

wherein the improvement comprises that:

(a) means are provided for enabling perpendicular relative movement between said apparatus and a document being tested;

(b) each magnetic circuit consists in one part of soft-magnetic material and in another part of magnetized permanent-magnetic material;

(c) each air gap is formed between an end of a pole shoe of the soft-magnetic material and an associated pole of the magnetized permanent-magnetic material;

(d) each detector is a coil wound exclusively about the associated pole shoe of the soft-magnetic material; and (e) each pole of said magnetized permanent-magnetic material is arranged in its associated magnetic circuit in such a way that said coil of that magnetic circuit is always exposed to a static magnetic flux of a predetermined density parallel to the axis of the coil, to determine an optimal operating point at said soft-magnetic material.

2. The apparatus of claim 1, wherein the air gap between the pole of the magnetized permanent-magnetic material and the pole shoe of the soft-magnetic material is about twice as wide as the distance existing during the performance of a test between the apparatus and the document being tested.

3. The apparatus of claim 1, wherein a plurality of magnetic circuits with a detector form a measuring system, each magnetic circuit having an air gap, and the respective air gaps being formed between an end of a pole shoe of soft-magnetic material and an associated end of a pole of said magnetized permanent-magnetic material in each case.

4. The apparatus of claim 3, wherein the measuring system comprises two magnetic circuits having a pair of poles of magnetized permanent-magnetic material and an intermediate pole shoe of soft-magnetic material, the pole shoe end of the soft-magnetic material and the associated pole ends of the magnetized permanent-magnetic material defining each air gap pointing to the same side of the document being tested.

5. The apparatus of claim 3, wherein the stray fields of the two magnetic circuits are oriented perpendicular to the direction of relative movement between the apparatus and the document being tested.

6. The apparatus of claim 5, wherein each magnetized permanent-magnetic material is connected with the soft-magnetic material above and below the intermediate pole shoe in a plane perpendicular to the direction of relative movement between the apparatus and the document being tested, respective like poles of said magnetized permanent-magnet material pointing to the document being tested, and the extent of the stray fields corresponding approximately to the width of the document being tested.

7. The apparatus of claim 3, wherein a plurality of measuring systems are provided, and the plurality of measuring systems are disposed side by side in a direction parallel to the direction of relative movement between the apparatus and the document being tested.

8. The apparatus of claim 7, wherein a plurality of said measuring systems are disposed side by side in a direction perpendicular to the direction of said relative movement so as to form a multichannel assembly.

9. The apparatus of claim 3, wherein the apparatus comprises at least two measuring systems whose respective coils are connected electrically in series, so that the signals of a magnetic flux penetrating both systems in the same direction are compensated to zero.

10. The apparatus of claim 9, wherein the respective measuring systems are disposed side by side in a direction parallel to the direction of relative movement between the apparatus and the document being tested and are interconnected with each other via soft-magnetic material.

11. The apparatus of claim 9, wherein each the width of the pole shoes in each measuring system and the distance between each two measuring systems are selected in accordance with the desired spatial resolution.

12. The apparatus of claim 1, wherein the soft-magnetic material has a saturation magnetization of at least 0.6 Tesla.

13. The apparatus of claim 1, wherein the permeability ($\mu$=dB/dH) of the soft-magnetic material has values of $\mu > 10,000 \cdot uo$ at the magnetic operating point which is determined by the flux density of the static magnetic field.

14. The apparatus of claim 1, wherein said magnetized permanent-magnetic material used consists of highly coercive material, such as SmCo or Nd FeB.

15. The apparatus of claim 1, wherein the apparatus is provided with a shielding housing open on the measuring side and made of highly permeable material.

16. The apparatus of claim 3, wherein said measuring system comprises two magnetic circuits having a pair of pole shoes of soft-magnetic material and an intermediate pole of magnetized permanent-magnetic material, the pole end of said magnetized permanent-magnetic material and the associated pole shoe ends of the soft-magnetic material defining each air gap pointing to the same side of the document being tested.

* * * * *